April 21, 1970     C. M. WORTHLEY     3,508,035
ROLL AVERAGE COMPUTING METHOD AND APPARATUS
Filed Nov. 8, 1966     2 Sheets-Sheet 1

INVENTOR.
CHARLES M. WORTHLEY
BY
James J. O'Reilly
PATENT AGENT

April 21, 1970  C. M. WORTHLEY  3,508,035
ROLL AVERAGE COMPUTING METHOD AND APPARATUS
Filed Nov. 8, 1966  2 Sheets-Sheet 2

INVENTOR.
CHARLES M. WORTHLEY
BY
James J. O'Reilly
PATENT AGENT

United States Patent Office 3,508,035
Patented Apr. 21, 1970

3,508,035
ROLL AVERAGE COMPUTING METHOD AND APPARATUS
Charles M. Worthley, Orange Park, Fla., assignor to Industrial Nucleonics Corporation, a corporation of Ohio
Filed Nov. 8, 1966, Ser. No. 592,927
Int. Cl. G06g 7/32
U.S. Cl. 235—151.3     14 Claims

ABSTRACT OF THE DISCLOSURE

Specifically disclosed is a method and apparatus for determining the average value of a property such as weight per unit area or moisture content, or the standard deviation of such property in a sheet material such as paper which is formed into a roll, or for automatically computing the weight of the roll in response to a scanning gauge which traverses back and forth across the width of the sheet before it is formed into a roll. A signal from the scanning gauge is integrated for a period of time determined automatically from signals generated at the beginning and end of the roll. The integrated signal is combined with signals indicative of the length and width of the material forming the roll to compute the weight of the roll. Separate, successive averages may be computed for each of the several traversing movements of the scanning gauge across the width of the sheet, and the average value of such averages provides the value for the measured property such as the weight per unit area which is used in the roll weight computation.

---

This invention relates generally to the measurement of sheet products and, more particularly, to a method and means for measuring the average value of a physical dimension of a sheet formed into a roll.

BACKGROUND FOR THE PRESENT INVENTION

In many industrial processes, a sheet of material of extensive length is wound up on a roll or reel. For example, steel and plastic strips previously formed and treated are trained around windup rolls. Paper is produced in a continuous sheet which is wound upon a reel. When one reel is filled, the sheet is cut and another reel is positioned to pickup the leading edge. Each reel may be cut into several rolls for ease of handling.

Regardless of the nature of the material being handled, it is desirable to know the value of certain properties of the rolled sheet. For example, reports on production should include the average weight per unit area, thickness or moisture content of the roll. Heretofore, it has been difficult to obtain accurate tallies of these production variables because of the extensive amount of product and time required to produce each roll.

BRIEF DESCRIPTION OF THE PRESENT INVENTION

To provide the desired production data on each roll, I determine an average value of the desired variable by measuring the instantaneous value of the variable across the width of the moving sheet and averaging the measurement over a period of time required to wind the sheet up.

In more specific embodiments, I use a scanning gauge responsive to the variable of interest to measure the instantaneous value of the variable in different zones extending transversely across the sheet and a computer to compute the average value of the variable for each zone. The measuring and averaging operations are initiated when a new roll is started. Successive scans and zone averages are made and each zone average is stored until the roll is complete. At the end of the roll, a signal is generated to stop the zone measuring and averaging operation, whereupon I automatically compute the average value of the stored zone averages to indicate the average value of the variable for the rolled sheet.

In terms of alternative specific apparatus, I employ a scanning radiation gauge to provide a signal proportional to the weight per unit area variations of a plurality of different cross-sheet zones. A footage counter provides a signal indicative of the length of the rolled sheet which will be proportional to the area of the sheet, providing its width remains substantially constant. The signals are combined in a computer to provide an indication of the total weight of the roll, which is extremely useful in determining what amount of material is wasted when the roll is cut up into smaller rolls.

My invention may also be employed to measure the average moisture content, thickness or standard deviation of any variable of commercial interest.

OBJECTS OF THE PRESENT INVENTION

Accordingly, it is a primary object of my invention to provide a method and apparatus for measuring the average value of a variable property of sheet material formed into a roll.

It is another object of my invention to provide a measuring method and apparatus that presents information on roll production data more accurately than heretofore possible.

It is also an object of the present invention to provide roll production data in a form amenable to digital signal processing and display techniques.

It is an additional object of the present invention to provide production data measuring method and apparatus that may be readily adapted to industrial processes already in operation.

GENERAL DESCRIPTION

Figure 1:
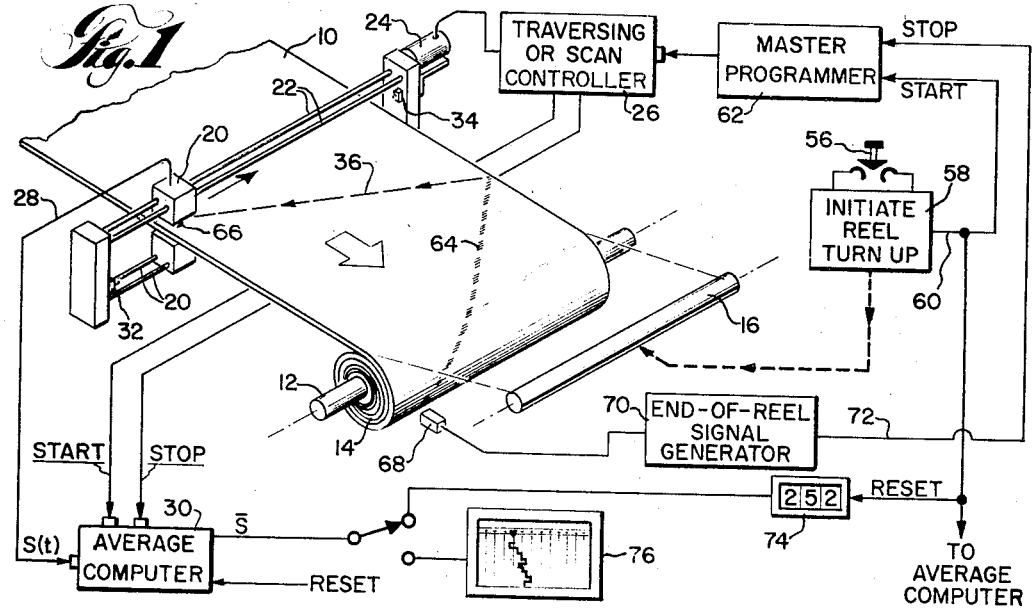
FIG. 1 is a perspective view, partly diagrammatic, of a sheet production data measuring apparatus constructed in accordance with the present invention.

Referring now to the drawings, and specifically to FIG. 1, there is illustrated a portion of a sheet production line wherein a sheet material 10 is wound upon a core 12 to form a roll 14. This, for example, may be the windup end of a plastic sheet extrusion process or other sheet production line such as a metal rolling mill. For purposes of illustration, the invention is described in relation to a paper making process. In this type of production, a paper sheet 10 coming from a dryer section is wound upon the core 12 until a reel is provided that is normally seven or eight feet in diameter. When sufficient paper has been wound to provide this reel, the sheet 10 is slit and a new core 16 is lowered into position (by apparatus not shown for purposes of simplicity). The leading edge of the traveling sheet 10 travels around the new core 16 and the old reel is removed and cut into separate rolls. While the term "roll" in the case of a paper making machine refers specifically to separate items cut from a reel, the term "roll" as used in this application refers to a given length of sheet wound around a core or other central member.

According to the present invention a gauge 20 is used to scan across the sheet in a direction indicated by the small arrow. The gauge 20 may be mounted on traversing rods 22 that extend above and below the sheet 10 as shown. The gauge 20 is moved from one side of the sheet to the other by means of a motor 24 energized by a traversing or scan controller 26.

The gauge 20 may be responsive to variations in a physical property of the sheet 10 to provide a signal $S(t)$ on line 28. An average computer 30 is coupled to the gauge 28 and computes the average value of the signal developed by the gauge 20. Limit switches 32 and 34 may be provided on either side of the sheet 10 to cause the gauge to scan slowly in one direction across the sheet and to return quickly to the opposite side of the sheet as indicated by the dotted lines 36. A more detailed description of this two-speed scanning system may be found in U.S. Patent 3,015,129, issued on Jan. 2, 1962, to W. C. Hays et al. and assigned to the same assignee as the present application. The operation of the average computer 30 is controlled by start and stop signals transmitted from the scan controller 26. In this system an average is computed only during the slow scan portion of the cycle; it is obvious to one skilled in the art that an average can be computed also during the return scan, which may be made at the same speed thereby providing a substantially continuous integration of the gauge signal.

Figure 2:
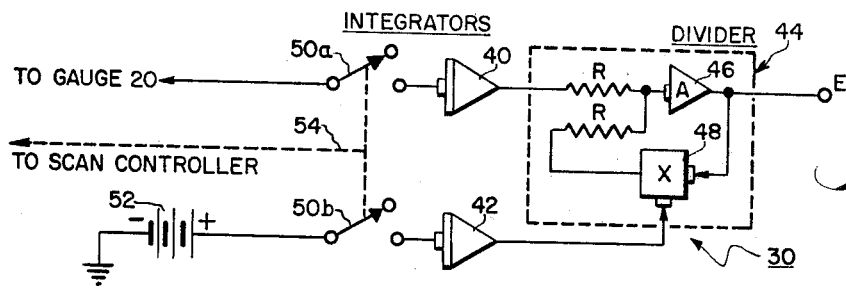
FIG. 2 is a schematic diagram of a time independent computer useful in the apparatus shown in FIG. 1.

Referring briefly to FIG. 2, the average computer 30 is shown in greater detail. The computer 30 is seen to include a pair of integrators 40 and 42 and a divider circuit 44. The divider circuit 44 comprises an amplifier 46, a pair of summing resistors R and a multiplier 48 connected in a feedback loop. The input circuit of integrator 40 is connected to the gauge 20 by means of a switch 50a. The input of integrator 42 is connected by means of a switch 50b to a source of a constant potential represented by the battery 52. These switches are ganged together and coupled to the scan controller 26 as indicated by the heavy dotted line 54. The computer is constructed to provide an output signal E which is proportional to the average value $\bar{S}$ of the signal $S(t)$ as indicated by the following equation:

$$\bar{S} = \frac{\int_0^T S(t)dt}{T} \quad (1)$$

where T is the elapsed time of integration. Reference may be made to the copending application, Ser. No. 545,499, filed Apr. 26, 1966, by H. T. Jaggers and M. P. Grant and assigned to the same assignee as the present application for a more detailed description of a computer having particular utility in my roll averaging system.

OPERATION

Referring now to FIGS. 1 and 2, the operation of the present invention will now be described.

A new reel may be initiated by means of a manually operated push button 56 connected to unit 58 or by automatic means not shown. A reel turn-up signal on line 60 is transmitted to a master programmer unit 62 coupled to the traversing or scan controller 26. When the core begins to wind up the sheet 10, the scan controller 26 causes the gauge 20 to traverse the sheet along zones as indicated by the cross-hatched areas 64 and 66. Integrator input switches 50a and 50b are enclosed as the gauge traverses from left to right, as seen in FIG. 1. Integrator 40 develops a signal proportional to $$\int_0^T S dt$$

Integrator 42 provides a signal proportional to the time of integration T. As soon as the gauge 20 reaches the far side of the sheet 10 and begins its fast return, the switches 50a and 50b are opened. When the gauge 20 reaches the left-hand side of the sheet, a new traverse is initiated by the traversing controller 26. Integration of the gauge signal $S(t)$ is resumed as the switches 50a and 50b are again closed.

The scanning and averaging operations are continued until a reel 14 of predetermined size has been attained. The end of the reel may be determined either by an operator or by means of a limit switch 68 mounted adjacent to the reel 14 and coupled to an end-of-reel signal generator 70. The output signal of the end-of-reel signal generator on line 72 may be used to stop the scanning and averaging operations of the gauge 20 and computer 30.

At the end of the formation of the reel 14, the output of the average computer 30 may be read out either on a digital display device 74 or on an analog instrument such as a strip chart recorder 76. Either display device indicates the average value of the variable of interest of the entire reel of rolled sheet. The digital display device 74 and the average computer 30 may be automatically reset by a reel turnup signal appearing on line 60 when a new reel is started. The scan controller 26 automatically positions the gauge 20 at the left-hand edge of the sheet 10 to make it immediately available for a new scan series upon initiation of the reel turnup by means of switch 56.

REEL WEIGHT COMPUTER

While several variables of the sheet may be averaged, one that is especially desirable is the weight per unit area. A radiation gauge such as that described in the Hays et al. patent cited above commonly provides an output signal proportional to the weight per unit area of the sheet being measured.

Figure 3:
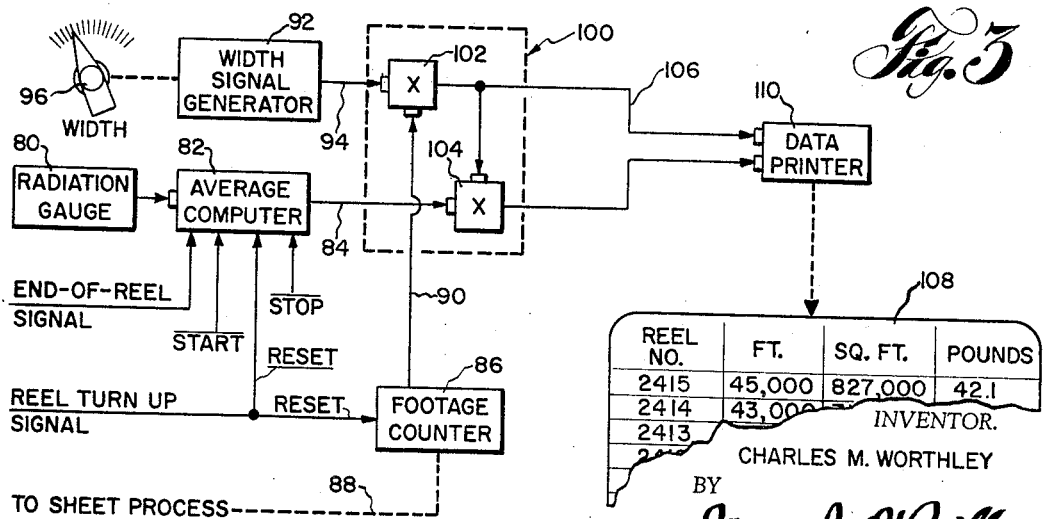
FIG. 3 is a block diagram of a roll weight computing apparatus constructed in accordance with the present invention.

Referring now to FIG. 3, a radiation gauge 80 is coupled to an average computer 82 which operates in a similar manner to that described above in reference to FIG. 2. The radiation gauge 80 is traversed back and forth across the sheet to measure the weight per unit area variations in zones extending transversely across the sheet. Of course, the zones need not extend completely across the width of the sheet to obtain a representative average. The average reel weight per unit area appears at the output of average computer 82 on line 84 at the end of each reel. This signal need only be multiplied by the total area of the sheet to determine the weight of the sheet in the reel.

A footage counter 86 is coupled to the process as indicated by the dotted line 88 to provide a signal on line 90 indicative of the total number of feet in the reel. Other expedients may be employed for providing the desired length of sheet. For example, if the process runs at a substantially constant velocity, a timer can be used to provide a signal proportional to the length L of the rolled sheet. Since the width of the material will remain substantially constant for a given specification run, a width signal generator 92 may be employed to provide a width signal on line 94. The operator may dial in the width of the sheet being run by means of a knob 96 coupled to the signal generator 92. If the width is not invariant a width gauge can be employed to provide a signal on line 94 proportional to the average sheet width.

The weight computer 100 comprises a pair of multipliers 102 and 104. Multiplier 102 forms a product of the length and width signals on lines 90 and 94 respectively, and provides an output signal on line 106 proportional to the area of sheet rolled into the reel. Multiplier 104 is used to form the product of the area signal on line 106 with the average weight per unit area signal transmitted from the average computer 82. The construction of multipliers 102 and 104 will be apparent to those skilled in the art. At the end of each reel, the derived data may be printed out on a production report sheet 108 by means of a data printer 110. Both the average computer and the footage counter may be reset by the reel turnup signal.

ALTERNATIVE EMBODIMENTS OF THE PRESENT INVENTION

Figure 4:
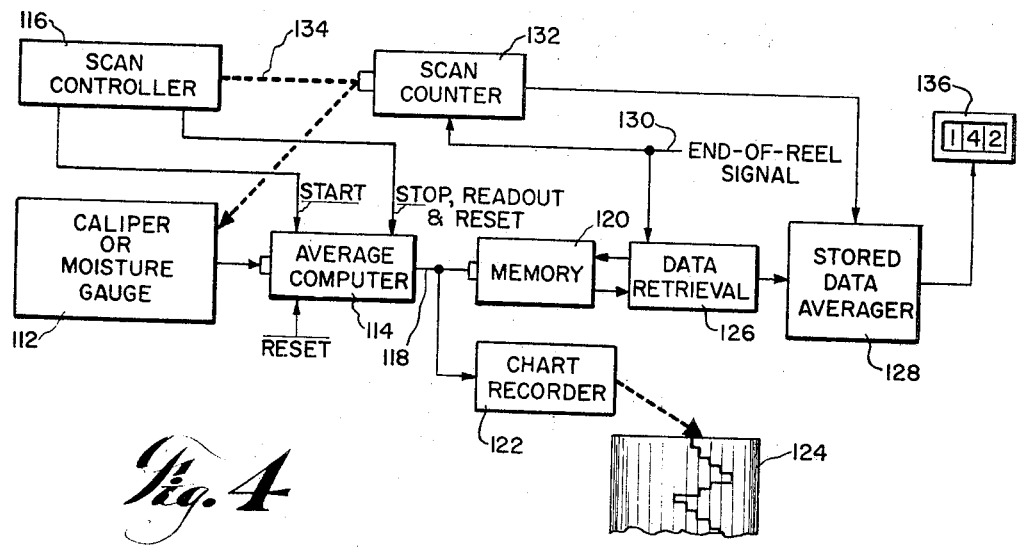
FIG. 4 is a block diagram of an alternative embodiment of the present invention.

Other techniques may be employed to compute the average value of the measured variable. One such technique is a signal storing system illustrated in FIG. 4. In FIG. 4 the measurements of a caliper or moisture gauge 112 are averaged by a computer 114. A magnetic thickness gauge or a moisture gauge similar to that described in U.S. Patent 3,155,901, issued Nov. 3, 1964, to A. Hanken and assigned to the same assignee as the present application, may be used. The gauge 112 is coupled to average computer 114, the operation of which is controlled by a scan controller 116. The average computer 114 develops an output signal at the end of every scan on line 118 proportional to the average value of the thickness or moisture content of the cross-sheet zone traversed by the gauge 112. Each scan average is stored in a memory 120 until the reel has been formed. A chart recorder 122 may be used to present the individual scan averages on a chart 124.

Memory unit 120 may be a magnetic drum or tape device from which the individual scan averages can be removed by a data retrieval unit 126 and transmitted to a stored data averager 128. Data retrieval is initiated by the end-of-reel signal appearing on line 130.

A signal proportional to the number of scans made by the gauge is provided by a scan counter 132 which is mechanically coupled to the scan controller 116 as indicated by the heavy dotted line 134. The number of scans for each reel may be different when different lengths of material are run and this signal is read out of the scan counter 132 when the end-of-reel signal appears on line 130.

The stored data averager 128 provides an output signal proportional to the sum of the individual scan averages divided by the number of scans. The output signal of the stored data averager 128 is therefore representative of the average moisture content or thickness of the rolled sheet and may be displayed by a digital readout device 136.

Besides thickness, weight per unit area and moisture, it may be desirable to provide indications of the average standard deviation $\bar{\sigma}$ of one of these variables or some other variable over the entire length of rolled sheet. Standard deviation $\sigma$ is a production figure invaluable in assessing quality control of a product.

Figure 5:
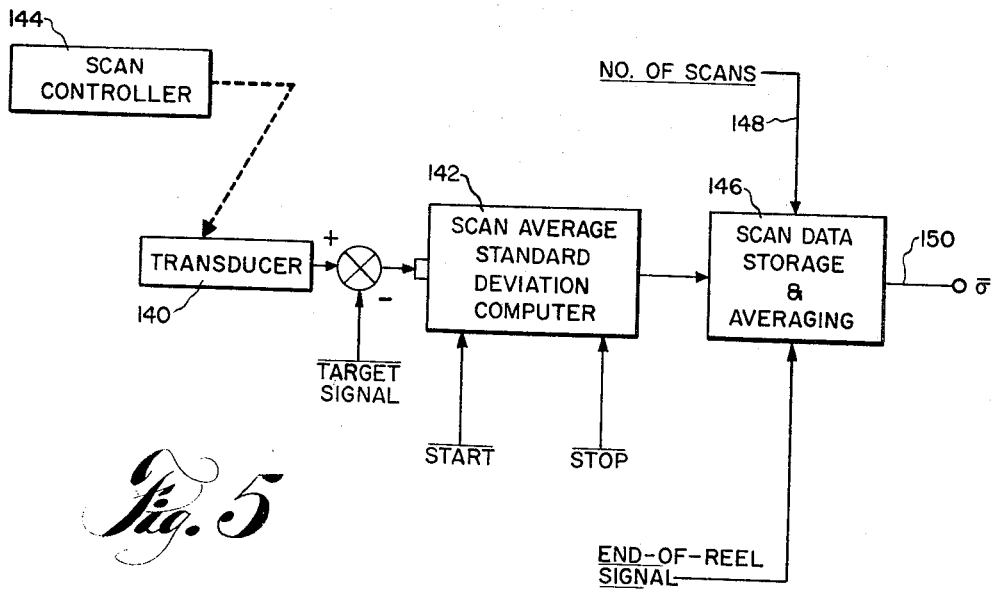
FIG. 5 is a block diagram of another alternative embodiment of the present invention.

Referring now to FIG. 5, a transducer 140 responsive to the variable of interest provides an output signal from which is subtracted a target signal proportional to the desired specification value for the variable. A difference signal is transmitted to the scan average standard deviation computer 142 which is controlled by signals from a scan controller 144. The scan standard deviation computer may be constructed as disclosed in U.S. Patent 3,150,253, issued Sept. 22, 1964, to P. Spergel and assigned to the same assignee as the present application.

At the end of each scan, the average value of the standard deviation measured is transmitted to a scan data storage and averaging unit 146. In a manner similar to that described above, the number of scans is entered on line 148 and an end-of-reel signal causes a signal proportional to the average value $\bar{\sigma}$ of the standard deviation of the variable for the roll of material to be developed on line 150.

SUMMARY

I have provided a systematic method and apparatus for accumulating production data on a rolled sheet product. The sheet is scanned and measured for variations in the variable of interest before it is wound up. The scanning speed is selected to provide for a more representative measurement. Both a continuous, time-independent averaging and a signal storage and averaging technique is disclosed.

Although certain specific embodiments of the invention have been shown and described herein, many modifications may be made thereto without departing from the true spirit and scope of the invention as set forth in the appended claims.

I claim:
1. The method of determining the weight of a roll formed from a sheet material of substantially constant width, comprising the steps of:
    measuring the length of said sheet forming said roll,
    measuring the average weight per unit area of said sheet in each of a plurality of different zones extending transversely across the width of said sheet, and spaced along the length thereof,
    automatically computing the average value of said zone average weight per unit area measurements to determine the average weight per unit area of said rolled sheet and the product of said length and average weight per unit area measurements to provide an indication of the weight of said rolled sheet.

2. Apparatus for determining the value of a physical property of a roll provided by forming means receiving a moving sheet of material, comprising:
    means for periodically scanning across the width of said sheet and computing the average value of said property during each of said sheet scans,
    means responsive to said roll forming means for automatically computing the average value of said sheet scan averages at the end of said roll, and
    means responsive to said computed average value to indicate the average value of said property for said entire roll.

3. In combination with a scanning gauge positioned adjacent to a moving sheet of material being formed into a roll, said gauge providing a signal proportional to the moisture content of said moving sheet,
    means responsive to the initiation of said roll formation for moving said scanning gauge across the width of said moving sheet,
    means responsive to said gauge signal for computing the average moisture content of each one of a plurality of zones extending transversely across the width of said sheet, and
    means responsive to said roll forming means for automatically computing the average value of said zone average measurements at the end of said roll to indicate the average moisture content of said rolled sheet.

4. In combination with a scanning gauge positioned adjacent to a moving sheet of material being formed into a reel, said gauge providing a first signal proportional to the moisture content of said moving sheet,
    means responsive to the initiation of said reel formation for moving said scanning gauge back and forth across the width of said moving sheet,
    means responsive to said gauge signal for providing a plurality of second signals, each of said second signals being proportional to the average moisture content of a different zone extending transversely across the width of said sheet,
    means for storing each of said second signals,
    means for generating a third signal at the end of said reel, and
    means responsive to said third signal for automatically computing the average value of said stored signals to indicate the average moisture content of said sheet on said reel.

5. In combination with a scanning radiation gauge positioned adjacent to a moving sheet of material, said radiation gauge providing a signal proportional to the weight per unit area of said moving sheet, means for moving said scanning radiation gauge back and forth across the width of said moving sheet, means responsive to said gauge signal for providing a plurality of second signals, each of said second signals being proportional to the average weight per unit area of a different zone extending transversely across the width of said sheet, and means for forming said sheet into a roll, the improvement comprising:
- means responsive to said roll forming means for generating a third signal at the beginning of said roll and a fourth signal at the end of said roll,
- means responsive to said third signal for initiating movement of said scanning radiation gauge,
- means for storing each of said second signals, and
- means responsive to said fourth signal for automatically computing the average value of said stored signals to indicate the average weight per unit area of said rolled sheet.

6. In combination with a scanning gauge positioned adjacent to a moving sheet of material of substantially constant width, said gauge providing a first signal proportional to the weight per unit area of said moving sheet, means for periodically moving said gauge across said sheet to measure the weight per unit area variations of said sheet in different zones extending transversely across the width of said sheet, and means for forming said sheet into a roll, the improvement comprising:
- means for integrating said first signal during the formation of said roll to provide a second signal proportional to the average weight per unit area of said rolled sheet,
- means responsive to the length of said sheet for providing a third signal proportional to the area of said sheet forming said roll,
- means for combining said second signal and said third signal to provide an output signal proportional to the product of said second signal and said third signal, and
- means responsive to said output signal for indicating the total weight of said rolled sheet.

7. The combination of claim 6 which further includes: means responsive to said third signal and said output signal for automatically printing the area and the weight of said reel on a permanent record.

8. The combination of claim 6 wherein said means responsive to said sheet length comprises a footage counter.

9. In combination with a scanning gauge positioned adjacent to a moving sheet of paper of substantially constant width, said gauge providing a first signal proportional to the weight per unit area of said moving sheet, means for periodically moving said gauge across said sheet to scan and measure the weight per unit area variations in different zones extending transversely across the width of said sheet, means for integrating said first signal to provide a plurality of second signals, each of said second signals being proportional to the average weight per unit area of a different zone, and means for forming said sheet of paper into a reel, the improvement comprising:
- means responsive to said roll forming means for generating a third signal at the beginning of said reel and a fourth signal at the end of said reel,
- means responsive to said third signal for initiating movement of said scanning gauge,
- means for storing said second signals,
- means for generating a fifth signal proportional to the number of scans across said sheet forming said reel,
- means responsive to said fifth signal for computing the average value of said stored second signals, and
- means responsive to said fourth signal for indicating the average weight per unit area of said entire reel of paper.

10. The combination as set forth in claim 9 in which said indicating means comprises a digital readout device.

11. The combination as in claim 9 which further includes:
- means for measuring the total length of said sheet, and
- means for combining said length and average weight per unit area measurements to provide a signal proportional to the weight of said sheet on said reel.

12. The combination of claim 5 which further includes means for measuring the width of said sheet,
- means for measuring the length of said rolled sheet, and
- means responsive to said length, width and average weight per unit area measurements for indicating the weight of said rolled sheet.

13. In combination with a scanning gauge positioned adjacent to a moving sheet of material, said gauge providing a signal proportional to the thickness of said moving sheet, means for moving said scanning gauge back and forth across the width of said moving sheet, means responsive to said gauge signal for providing a plurality of second signals, each of said second signals being proportional to the average thickness of a different zone extending transversely across the width of said sheet, and means for forming said sheet into a roll, the improvement comprising:
- means responsive to said roll forming means for generating a third signal at the beginning of said roll and a fourth signal at the end of said roll,
- means responsive to said third signal for initiating movement of said scanning gauge,
- means for storing each of said second signals, and
- means responsive to said fourth signal for automatically computing the average value of said stored second signals to indicate the average thickness of said rolled sheet.

14. Apparatus for determining the average standard deviation of a property of a roll provided by forming means receiving a moving sheet of material, comprising:
- means for measuring the standard deviation of said property in a plurality of different zones extending transversely across the width of said sheet to produce a plurality of standard deviation values, at least one for each of said zones,
- means for averaging said measured standard deviation values, and
- means responsive to said roll forming means for enabling said averaging means at the beginning of said roll and for disabling said averaging means at the end of said roll to provide an indication of the average standard deviation of said property for said rolled sheet.

References Cited

UNITED STATES PATENTS

| | | | |
|---|---|---|---|
| 2,703,386 | 1955 | Seney | 235—151.3 XR |
| 3,007,052 | 10/1961 | Hickman et al. | 250—83.30 |
| 3,067,939 | 12/1962 | Ziffer | 235—151.3 XR |
| 3,150,253 | 9/1964 | Spergel | 235—151.35 |
| 3,185,843 | 5/1965 | Hansen | 250—83.30 |
| 3,350,561 | 10/1967 | Dresia et al. | 250—8.3 XR |
| 3,378,676 | 4/1968 | Clement | 235—151.3 |

OTHER REFERENCES

Granino, A., and Theresa M. Korn: Electronic Analog Computer, (1) page 339, figure 9; (2) page 219, figure c.

MALCOLM A. MORRISON, Primary Examiner

E. J. WISE, Assistant Examiner

U.S. Cl. X.R.

235—151.35; 250—83.30